(12) United States Patent
Dooley

(10) Patent No.: US 9,359,956 B2
(45) Date of Patent: Jun. 7, 2016

(54) RELIGHTING A TURBOFAN ENGINE

(71) Applicant: Pratt & Whitney Canada Corp., Longueuil (CA)

(72) Inventor: Kevin Allan Dooley, Toronto (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 151 days.

(21) Appl. No.: 14/503,565

(22) Filed: Oct. 1, 2014

(65) Prior Publication Data
US 2015/0033754 A1 Feb. 5, 2015

Related U.S. Application Data

(62) Division of application No. 12/951,260, filed on Nov. 22, 2010, now Pat. No. 8,875,519, which is a division of application No. 11/379,622, filed on Apr. 21, 2006, now Pat. No. 7,861,533.

(51) Int. Cl.
*F02C 7/00* (2006.01)
*F02C 7/262* (2006.01)
*F02C 7/32* (2006.01)

(52) U.S. Cl.
CPC .. *F02C 7/262* (2013.01); *F02C 7/32* (2013.01)

(58) Field of Classification Search
CPC .............. F02C 7/26; F02C 7/262; F02C 9/28; F05B 2220/50
See application file for complete search history.

(56) References Cited

U.S. PATENT DOCUMENTS

| | | | |
|---|---|---|---|
| 2,952,973 A | 9/1960 | Hall et al. | |
| 4,060,981 A | 12/1977 | Hampton | |
| 4,062,185 A | 12/1977 | Snow et al. | |
| 4,292,802 A | 10/1981 | Snow | |
| 4,776,163 A * | 10/1988 | Brockmann | F02C 7/32 60/792 |
| 5,107,674 A | 4/1992 | Wibbelsman | |
| 5,349,814 A | 9/1994 | Ciokajlo et al. | |
| 5,694,765 A | 12/1997 | Hield et al. | |
| 5,735,116 A | 4/1998 | Mouton | |
| 5,845,483 A | 12/1998 | Petrowicz | |
| 5,867,979 A | 2/1999 | Newton et al. | |
| 6,467,725 B1 | 10/2002 | Coles et al. | |
| 6,914,344 B2 | 7/2005 | Franchet et al. | |
| 7,861,533 B2 | 1/2011 | Dooley | |
| 8,875,519 B2 | 11/2014 | Dooley | |
| 2005/0188704 A1 | 9/2005 | Butt | |

(Continued)

FOREIGN PATENT DOCUMENTS

| | | |
|---|---|---|
| EP | 0251289 A2 | 1/1988 |
| EP | 0798454 A2 | 10/1997 |

(Continued)

OTHER PUBLICATIONS

Walsh et al. "Gas Turbine Performance (2nd edition)", Blackwell Publishing 2004, Chapters 9 and 10.
International Search Report, PCT/CA2007/000417, Jul. 4, 2007.
Canadian Intellectual Property Office; Office Action dated Jul. 30, 2013 re: Canadian Patent Application No. 2,643,463.
Canadian Intellectual Property Office; Response to Office Action dated Jul. 30, 2013 re: Canadian Patent Application No. 2,643,463.

(Continued)

*Primary Examiner* — Gerald L Sung
(74) *Attorney, Agent, or Firm* — Norton Rose Fulbright Canada LLP

(57) ABSTRACT

The method and apparatus for in-flight relighting of a turbofan engine involve in one aspect selectively controlling an accessory drag load on one or more windmilling rotors to permit control of the windmill speed to an optimum value for relight conditions.

1 Claim, 3 Drawing Sheets

(56) References Cited

U.S. PATENT DOCUMENTS

2006/0137355 A1 6/2006 Welch et al.
2006/0260323 A1 11/2006 Moulebhar
2006/0272313 A1 12/2006 Eick et al.
2007/0017226 A1 1/2007 Butt et al.
2015/0033753 A1 2/2015 Dooley

FOREIGN PATENT DOCUMENTS

EP 1731735 A2 12/2006
GB 2038421 A 7/1980
JP 2001295669 10/2001

OTHER PUBLICATIONS

Canadian Intellectual Property Office; Office Action dated Apr. 16, 2014 re: Canadian Patent Application No. 2,643,463.
Canadian Intellectual Property Office; Response to Office Action dated Apr. 16, 2014 re: Canadian Patent Application No. 2,643,463.
European Search Report re: European Patent Application No. EP 1847699.
European Search Opinion re: European Patent Application No. EP 1847699.
U.S. Office Action dated Sep. 24, 2015 re: U.S. Appl. No. 14/503,541.

* cited by examiner

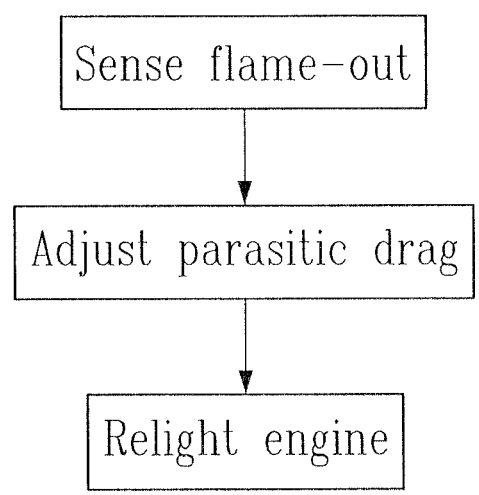

RELIGHTING A TURBOFAN ENGINE

CROSS-REFERENCE TO RELATED APPLICATIONS

The present application is a divisional of U.S. patent application Ser. No. 12/951,260 filed on Nov. 22, 2010, which is itself a divisional of U.S. patent application Ser. No. 11/379,622 filed on Apr. 21, 2006, now U.S. Pat. No. 7,861,533. The entire contents of each of the foregoing is incorporated herein by reference.

TECHNICAL FIELD

The invention relates to the in-flight relighting of an aircraft turbofan engine.

BACKGROUND

FIG. 1 schematically illustrates a typical turbofan engine 10 for subsonic flight. The engine 10 generally comprises in serial flow communication a fan 12 through which ambient air is propelled, a multi-stage compressor 14 for pressurising the air, a combustor 16 in which the compressed air is mixed with fuel and ignited for generating a stream of hot combustion gases, and a turbine section 18 for extracting energy from the combustion gases. The engine 10 also comprises an auxiliary or accessory gearbox (AGB) 20 on which are located mechanical and electrical systems, such as fuel pumps, oil pumps, generators and a starter/generator. The main rotating parts of the engine 10 are connected in two subgroups, the low pressure (LP) spool and the high pressure (HP) spool, which are coaxially disposed. In use, the engine 10 is started by the starter which is mechanically connected to the HP spool using a set of gears and a tower shaft 22. Once the desired HP spool speed is reached, fuel is provided into the combustor 16 and is ignited to start or "light" the engine 10.

When the engine 10 is mounted on an airplane, in the unlikely event of a flame out or engine shutdown, dynamic pressure due to forward speed of the airplane creates a windmill effect to spin the LP and HP spools. This spinning is then further assisted by the starter to spin the HP spool up to the starting speed so that relight can successfully occur. In other arrangements, a shaft power transfer arrangement is provided to transfer windmilling energy from the LP spool to the HP spool to assist acceleration of the HP spool to relight speed. However, there is a continuing need for simpler and better systems.

SUMMARY

In one aspect, the present invention provides a method for in-flight relighting a turbofan engine of an aircraft, the engine having at least two shafts, one of which is a high-pressure shaft mounted to a high-pressure compressor and a high-pressure turbine, the high-pressure shaft drivingly connected to an accessory load, the method comprising the steps of: disconnecting the accessory load from the high-pressure shaft to substantially eliminate a parasitic drag load on the high-pressure shaft; permitting ram air to rotate the high pressure shaft; and relighting the engine.

In another aspect, the present invention provides a method for in-flight relighting an aircraft turbofan engine, the engine having at least two shafts, one of which is a high-pressure shaft mounted to a high-pressure compressor, a high-pressure turbine and an electrical generator, the generator electrically driving an accessory load, the method comprising the steps of: determining the presence of an engine-out condition of the engine; using the generator to reduce the rate of rotation of the high-pressure shaft to a desired rate within a relight envelope; and relighting the engine.

In another aspect, the present invention provides a method for in-flight relighting an aircraft accessory gearboxless turbofan engine, the engine having at least two shafts, one of which is a high-pressure shaft mounted to a high-pressure compressor, a high-pressure turbine and a concentrically-mounted electrical generator, the generator electrically driving an accessory load, the method comprising the steps of: using exclusively ram air through the engine to rotate the high-pressure shaft; and then relighting the engine.

In another aspect, the invention provides a method of relighting a gas turbine engine of a fixed-wing aircraft after an in-flight engine-out condition, the engine having at least one electromagnetic bearing apparatus and at least a bladed propulsor mounted to a first shaft and a compressor and turbine mounted to a second shaft, the first shaft drivingly connected to an electric generator, the method comprising the steps of: using windmill rotation of the bladed propulsor to drive the generator; using electricity from the windmill-driven generator to provide power to the electromagnetic bearing apparatus; and relighting the engine.

BRIEF DESCRIPTION OF THE FIGURES

For a better understanding of the present method, and to show more clearly how it may be carried into effect, reference will now be made by way of example to the accompanying figures, in which:

FIG. 3 is block diagram illustrating the present method.

DETAILED DESCRIPTION

Figure 2:
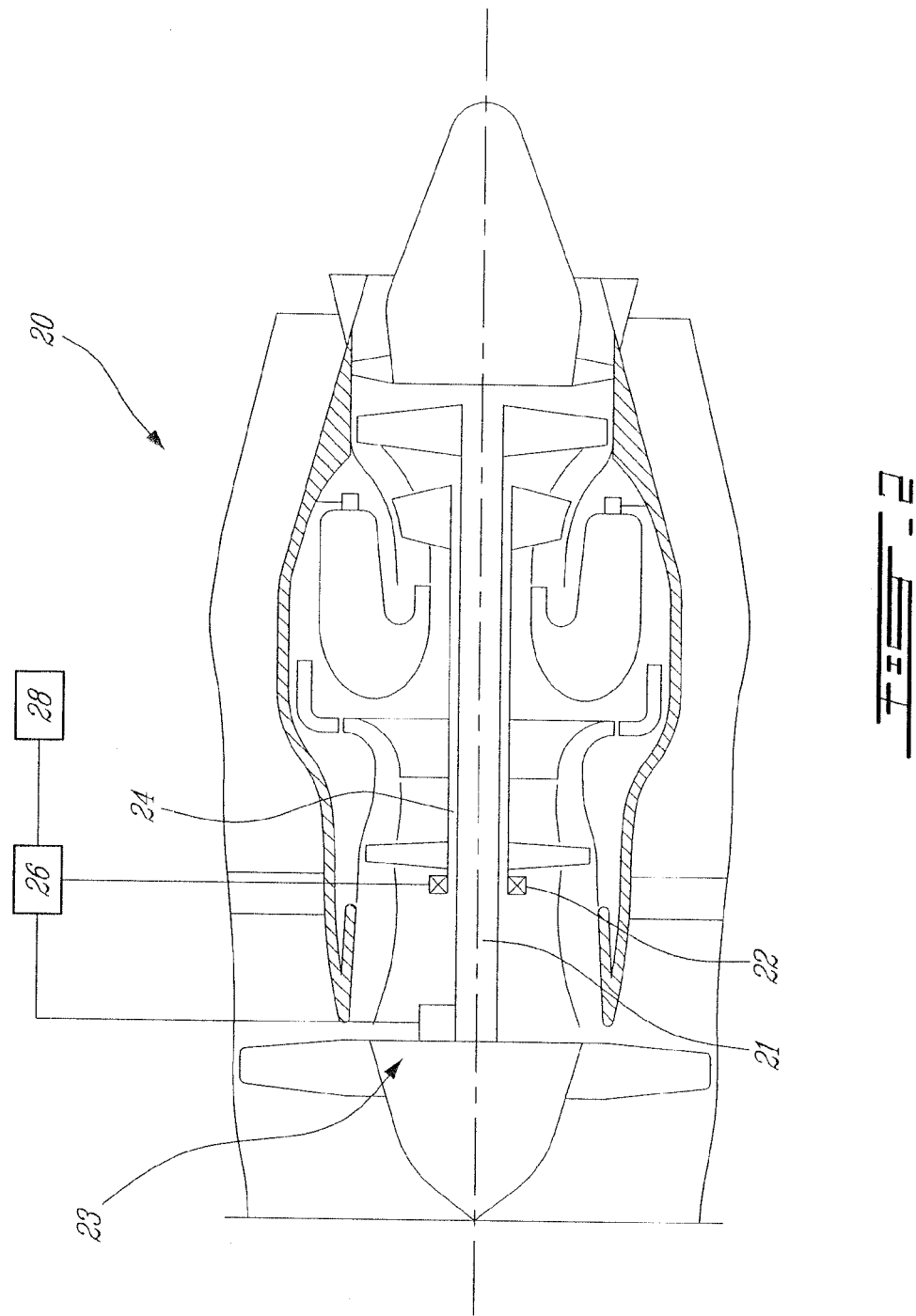
FIG. 2 is a schematic side view of an example of a turbofan gas turbine engine for use with the present method.

FIG. 2 shows a turbofan gas turbine engine 20 which generally comprises a low-pressure (LP) spool 21 supporting at least a fan and a turbine, and a concentric high-pressure (HP) spool 24 supporting at least a compressor and a turbine. An embedded or integrated generator or starter/generator 22 is coaxially mounted on the HP spool 24 of the engine 20, and preferably a second generator or motor/generator 23 is mounted on the LP spool 21 of the engine 20. Starter-generator 22 may be operated as a motor to light engine 20, and also preferably as a generator to generate electricity, which a controller 26 may then provide in form suitable for driving accessories 28 such as electrically-driven pumps and other engine and aircraft services. Generator 23 may be used likewise to generate electricity for controller 26 to provide to accessories 28 (but are not necessarily the same controller or accessories/services as driven by generator 22), and if a motor/generator, may be used to selectively drive the LP spool 21. Consequently, the need for an accessory gearbox is obviated, and is thus not present in engine 20. The design of engine 20 is not new, however the present invention offers new functionality to the engine 20 to provide improved in-flight relighting, as will now be described.

After a flame-out or other shut-down of engine 20 occurs requiring the engine to be relit, in-flight windmilling causes the LP spool 21 and HP spool 24 to rotate, which thus rotates starter-generator 22. During in-flight windmilling, controller 26 preferably partially or completely disconnects or stops supplying electricity to accessories 28, so there is substantially no electrical load drawn from starter-generator 22, and thus there is substantially no parasitic drag on the HP spool 24 caused by starter-generator 22. For example, in one embodiment shown in FIG. 3, a flame-out (or other engine-off) condition is initially detected by the controller 26, which controls the fuel and oil pumps 28. The controller also monitors electrical output from the generator(s), and includes suitable means to prevent power output to the aircraft electrical bus (also represented by 28) which does not meet the specification requirements—i.e. the controller 26 has control over whether the starter-generator 22 is connected to the bus in the 'generate' and 'start' modes. In a flame-out condition, an appropriate sensor signals the controller to stop the fuel pump from pumping fuel, and preferably also stops the oil pump, and the electrical output of the starter-generator 22 is also disconnected from the aircraft bus. Thus, electromagnetic drag on the HP spool 24 is reduced, and preferably effectively eliminated. Consequently, unlike the prior art, the accessories 28 are disconnected from the HP spool 24, preferably prior to relight.

Figure 1:
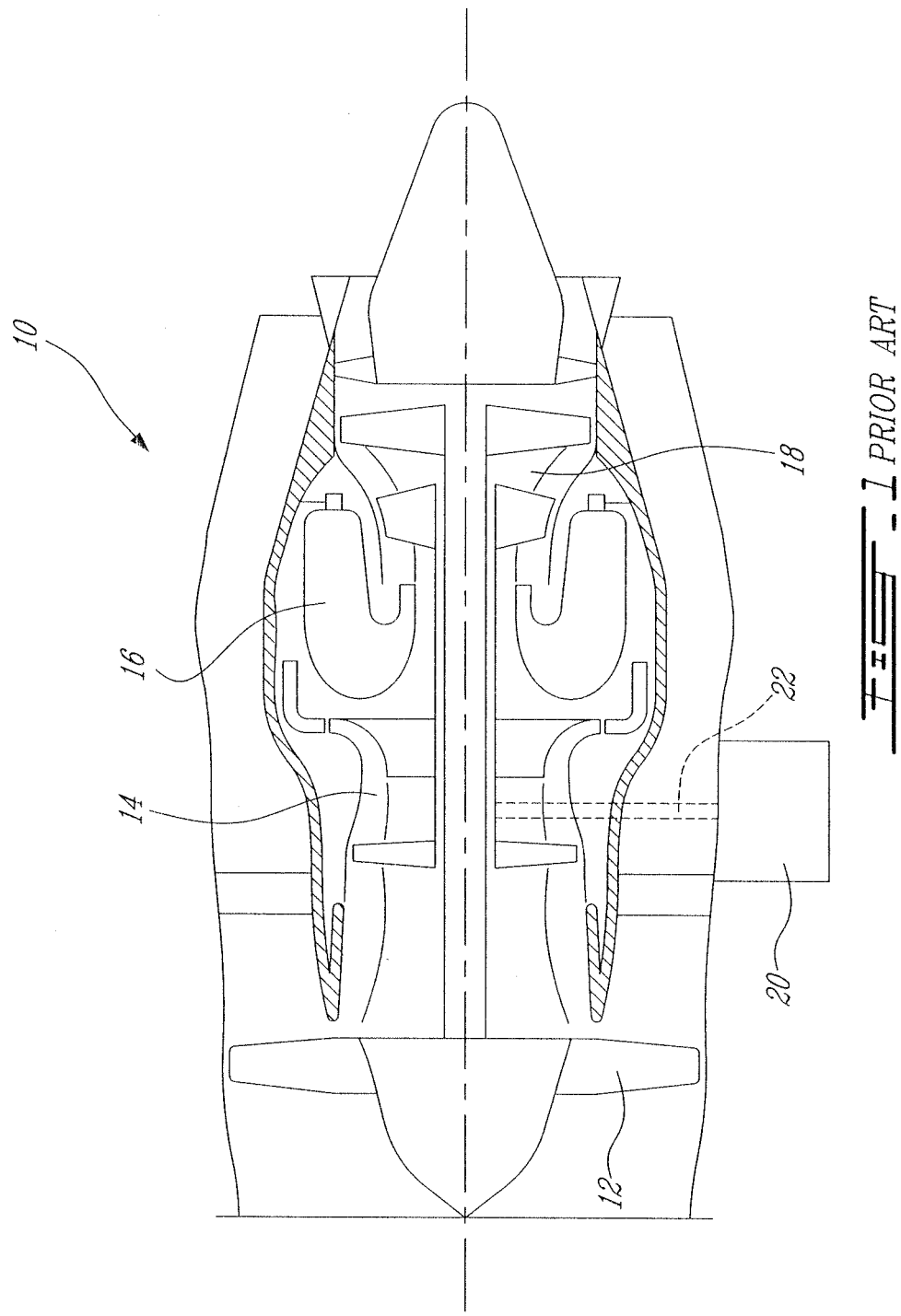
FIG. 1 schematic view of a typical turbofan gas turbine engine according to the prior art.

Referring again to the engine 10 of FIG. 1, during in-flight windmilling AGB 20 remains drivingly connected to the HP spool, and thus a plurality of gears and accessories continue to be driven by the HP spool, which creates a parasitic mechanical drag on the HP spool which tends to decelerate the HP spool windmilling speed. As previously described, another energy source is required to overcome this drag and accelerate the engine to its relight speed. However, by disconnecting the load from the HP spool 24 of engine 20, the parasitic drag of the accessory system is virtually eliminated and, in the right conditions, windmill speed alone becomes sufficient to spin the HP spool 24 at a desired starting speed, using only aircraft attitude if necessary to control windmill speed. Another external power source is not required, thereby simplifying the engine system. This greatly facilitates relighting of the engine 20 by extending the in flight relight envelope of the engine.

Therefore, the windmilling effect of ram air though the high spool may be used to rotate the engine to relight speed, particularly in very small turbofans having low inertia. Thus relight is achieved by disconnecting accessories and then using windmilling power, preferably alone and without the input of additional rotation energy from the starter-generator 22, or any other power transfer mechanism, to increase the speed of the HP spool.

In fact, conversely to the prior art, in some situations such as when descending rapidly on flame out conditions, the rotor may tend to spin too quickly, and thus prevent optimum relight conditions (e.g. lean blow out may occur if there is too much speed at the low fuel flows generally desired for starting), adjustable "drag" may be provided to the high rotor, e.g. by providing a braking force to slow the HP spool speed down. In one approach, this is achieved by operating the starter/generator 22 as a sort of electromagnetic brake, for example by controlling the current of the starter-generator via the controller 26. In another aspect, a mechanical braking arrangement may be employed to retard spool rotation. This may be used to put an upper limit on windmill speed under conditions requiring a specific relight speed, without requiring the pilot to set a different decent rate than was required for other reasons (for example, in the case where both engines flame out, descending to an altitude where there is air to breathe is often high on the pilot's list of priorities). Thus, controlling the windmill speed to an optimum value for relight, whether increasing or decreasing the rotor speed as necessary, is available with the present concept.

In another aspect of the present invention, in the case of flame-out, generator 23 may provide self-contained back-up electrical to power during windmilling to a magnetic bearings power system (indicated as among the elements of 28) to support the required shafts or spools during power-out situations. The LP spool generator does not induce parasitic drag on the HP spool, and thus no hamper relighting of the HP spool.

The above description is meant to be exemplary only, and one skilled in the art will recognize that other changes may also be made to the embodiments described without departing from the scope of the invention disclosed. For instance, the starter-generator can be any suitable design, and may in fact be provided by two different units (e.g. separate starter and generator). Although it is desirable to adjust parasitic drag (e.g. by disconnecting accessories and/or reducing rotor speed) prior to commencing relight procedures, the operations may be performed in any desired order. Although electrically disconnecting of the HP spool from accessory drive systems is preferred, any suitable selectively operable disconnect system may be employed. Still other modifications may be apparent to those skilled in the art, in light of a review of this disclosure, and such modifications are intended to fall within the appended claims.

What is claimed is:

1. A method of relighting a gas turbine engine of a fixed-wing aircraft after an in-flight engine-out condition, the engine having at least one electromagnetic bearing apparatus and at least a bladed propulsor mounted to a first shaft and a compressor and turbine mounted to a second shaft, the first shaft drivingly connected to a first electric generator, the method comprising:
   using windmill rotation of the bladed propulsor to drive the generator;
   using electricity from the windmill-driven first electric generator to provide power to the electromagnetic bearing apparatus; and
   while the second shaft is rotating due to windmilling, disconnecting an electrical load from a second electric generator driven by the second shaft and then relighting the engine.

* * * * *